United States Patent
Chen et al.

(10) Patent No.: US 7,910,256 B2
(45) Date of Patent: Mar. 22, 2011

(54) METHOD FOR SUPPLYING FUEL TO FUEL CELL

(75) Inventors: Charn-Ying Chen, Taoyuan County (TW); Chun-Lung Chang, Taoyuan County (TW); Der-Hsing Liou, Taoyuan County (TW); Chih-Yuan Hsu, Taoyuan County (TW); Rui-Xiang Wang, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 216 days.

(21) Appl. No.: 12/207,603

(22) Filed: Sep. 10, 2008

(65) Prior Publication Data

US 2010/0003547 A1  Jan. 7, 2010

(30) Foreign Application Priority Data

Jul. 11, 2008  (TW) ............................... 97126322 A

(51) Int. Cl.
 *H01M 8/04* (2006.01)
(52) U.S. Cl. ......... 429/443; 429/430; 429/431; 429/432
(58) Field of Classification Search .................... 429/13, 429/65, 447, 400, 428
See application file for complete search history.

(56) References Cited

U.S. PATENT DOCUMENTS

| 6,698,278 B2 | 3/2004 | Zhang et al. |
| 6,824,899 B2 | 11/2004 | Acker et al. |
| 6,991,865 B2 | 1/2006 | Acker et al. |
| 2005/0058885 A1* | 3/2005 | Brocklin et al. ................ 429/65 |

FOREIGN PATENT DOCUMENTS

TW  I282636  7/2007

* cited by examiner

*Primary Examiner* — Jonathan Creapeau
*Assistant Examiner* — Kenneth Douyette
(74) *Attorney, Agent, or Firm* — WPAT, PC; Justin King

(57) ABSTRACT

The present invention provides a method for supplying fuel to a fuel cell, in which a monitoring period is determined for monitoring the fuel cell, and then a feeding amount of fuel is determined by integrating characteristic value generated from the fuel cell in the monitoring period. In another embodiment, it is further comprising a step of determining the variation profile associated with the characteristic value during the period so as to judge whether it is necessary to feed the fuel into the fuel cell or not. By means of the present invention, the supplying of fuel to the fuel cell under dynamic loadings can be effectively controlled for optimizing the performance of the fuel cell as well as reducing the cost without installing any fuel sensor.

4 Claims, 12 Drawing Sheets

1

```
┌─────────────────────────────┐
│ determining a specific      │
│ monitoring period for a     │
│ fuel cell module when the   │──── 10
│ fuel cell module is         │
│ subjected to a load         │
└─────────────────────────────┘
              │
              ▼
┌─────────────────────────────┐
│ a specific amount of a fuel │
│ is determined to be         │
│ injected into the fuel cell │──── 11
│ according to the            │
│ measurement of a function   │
│ relating to the time        │
│ integral of a specific      │
│ characteristic value        │
└─────────────────────────────┘
```

FIG.1

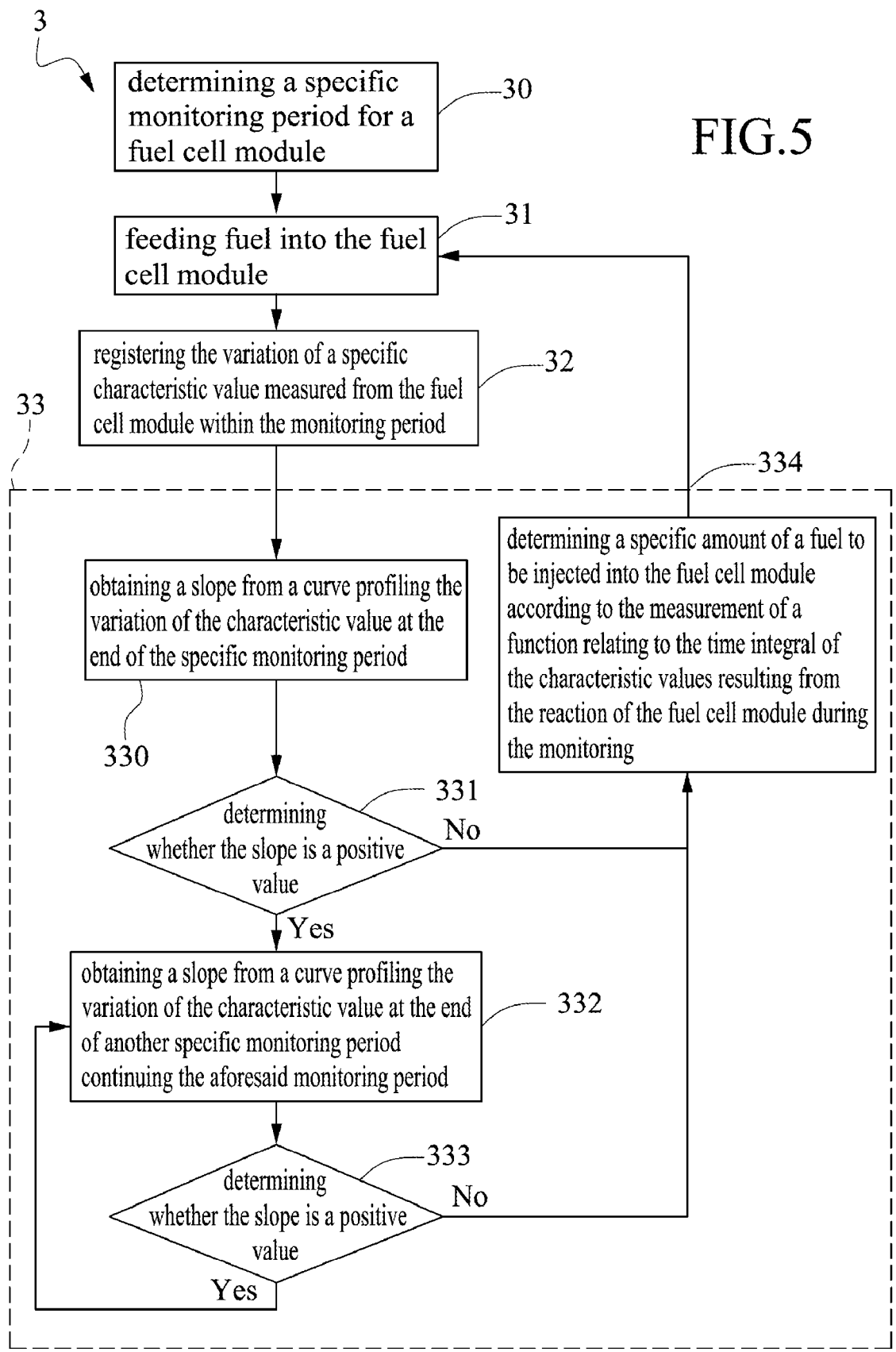

METHOD FOR SUPPLYING FUEL TO FUEL CELL

FIELD OF THE INVENTION

The present invention relates to a method for supplying fuel to fuel cell, and more particularly, to a fuel supplying method capable of determining a specific amount of a fuel to be injected into a fuel cell according to the measurement of a function relating to the time integral of a specific characteristic value resulting from the reaction of the fuel cell.

BACKGROUND OF THE INVENTION

A fuel cell is an electrochemical energy conversion device, similar to a battery in that it provides continuous DC power, which converts the chemical energy from a fuel directly into electricity and heat. For example, one type of fuel cell includes a proton exchange membrane (PEM), often called a polymer electrolyte membrane, that permits only protons to pass from anode to cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. When operated directly on hydrogen, the fuel cell produces this energy with clean water as the only by-product. Unlike a battery, which is limited to the stored energy within, a fuel cell is capable of generating power as long as fuel is supplied continuously. Although hydrogen is the primary fuel source for fuel cells, the process of fuel reforming allows for the extraction of hydrogen from more widely available fuels such as natural gas and propane or any other hydrogen containing fuel. For a growing number of power generators and users, fuel cells are the key to the future since it is an environment-friendly power source with high energy conversion efficiency.

Among the fuel cells, a direct methanol fuel cell or so called DMFC is a promising candidate for portable applications in recently years. The difference between DMFC and other power generating devices, such as PEMFC, is that the DMFC takes methanol as fuel in substitution for hydrogen. Because of utilizing liquid methanol as fuel for reaction, the DMFC eliminates the on board $H_2$ storage problem so that the risk of explosion in the use of fuel cells is avoided, which substantially enhances the convenience and safety of fuel cells and makes DMFC more adaptable to portable electronic appliances such as Laptop, PDA, GPS and etc, in the future.

During the electrochemical reaction occurred in the fuel cell, the fuel concentration is a vital parameter affecting the performance of the liquid feed fuel cell system. However, DMFC suffers from a problem that is well known to those skilled in the art: methanol cross-over from anode to cathode through the membrane of electrolyte, which causes significant loss in efficiency. It is important to regulate the supplying of fuel appropriately to keep methanol concentration in a predetermined range whereby DMFCs system can operate optimally. For example, a fuel sensor, such as methanol concentration sensor disclosed in the prior art, is utilized to detect the concentration of methanol so as to provide information for controlling system to judge a suitable timing to supply methanol. Although the foregoing method is capable of controlling the concentration of the fuel, it still has the drawbacks as following: (1) the complexity and cost of the fuel cell system are increased; (2) considering the aging of the membrane electrode assembly (MEA) of the fuel cell, the fuel concentration sensor used therein will have to be calibrated in a regular base for maintaining a specific level of accuracy so that a lot of experimental effort like calibration is necessary through the use of concentration sensor. Moreover, the control complexity of the fuel cell using fuel concentration sensor is increased as the measurement of the fuel concentration sensor can be easily affected by temperature variation.

In order to reduce the cost and complexity caused by the additional concentration sensor in the prior arts, a couple of fuel sensor-less control for DMFCs approaches have been disclosed to decrease the cost and complexity of the fuel cells system and improve the stability of fuel cell operation by monitoring one or more of the fuel cells' operating characteristics. For instance, in U.S. Pat. No. 6,824,899, a method is provided to optimize the fuel concentration by detecting the short circuit current or open circuit potential. However, since the method requires to short circuit the fuel cell in periodical manner for current detection, it is easily to cause damage to the fuel cells and thus affects the stability and lifespan of the fuel cells system.

According to the drawbacks of the prior arts described above, it deserves to provide a method for supplying fuel to fuel cells to solve the problem of the prior arts.

SUMMARY OF THE INVENTION

The primary object of the present invention is to provide a fuel supplying method, capable of determining a specific amount of a fuel to be injected into the fuel cell according to the measurement of a function relating to the time integral of a specific characteristic value resulting from the reaction of the fuel cell within a specific monitoring period for optimizing the performance of the fuel cell.

It is another object of the invention to provide a method for supplying fuel to fuel cell, which performs a numerical operation/comparison upon a characteristic value measured from a fuel cell when the fuel cell is subjected to a load for using the result of the numerical operation/comparison to determine when to inject fuel into the fuel cell, and thereby, since the timing and quantity for fuel injection is determined without the use of any fuel sensor, not only the manufacturing cost of the fuel cell is reduced, but also the control precision and system reliability of the fuel cell as well as its durability are all being enhanced.

It is further another object of the invention to provide a method for supplying fuel to fuel cell, capable of enabling the fuel cell to operate under a comparatively wider fuel concentration range without being affected by temperature variation and the aging of its membrane electrode assembly (MEA), and thereby, not only the fuel efficiency of the fuel cell is increased, but also its system response time to load variation is shortened. Moreover, since the aforesaid method enables a fuel cell to function without the need for any fuel concentration sensor, not only the volume and weight of the fuel cell is reduced so that the power density of the fuel cell is increased, but also the manufacturing cost and the system complexity are reduced, as well as its durability and reliability are enhanced.

To achieve the above object, the present invention provides a method for supplying fuel to fuel cell, which comprises the steps of: (a) determining a specific monitoring period for a fuel cell when the fuel cell is subjected to a load; (b) determining a specific amount of a fuel to be injected into the fuel cell according to the measurement of a function relating to the time integral of a specific characteristic value resulting from the reaction of the fuel cell within the monitoring period.

In an exemplary embodiment, the present invention provides a method for supplying fuel to fuel cell, which comprises the steps of: (a) determining a specific monitoring period for a fuel cell when the fuel cell is subjected to a load; (b) measuring the variation of a specific characteristic value of the fuel cell within the monitoring period; and (c) evaluating the variation trend of the specific characteristic value at the end of the specific monitoring period to be used as a reference for determining whether to feed fuel to the fuel cell or not; if so, a specific amount of a fuel to be injected into the fuel cell is determined according to the measurement of a function relating to the time integral of the characteristic values resulting from the reaction of the fuel cell during the monitoring period.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 1 is a flow chart depicting steps of a method for supplying fuel to fuel cell according to a first embodiment of the invention.

FIG. 5 is a flow chart depicting steps of a method for supplying fuel to fuel cell according to a third embodiment of the invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 2A:
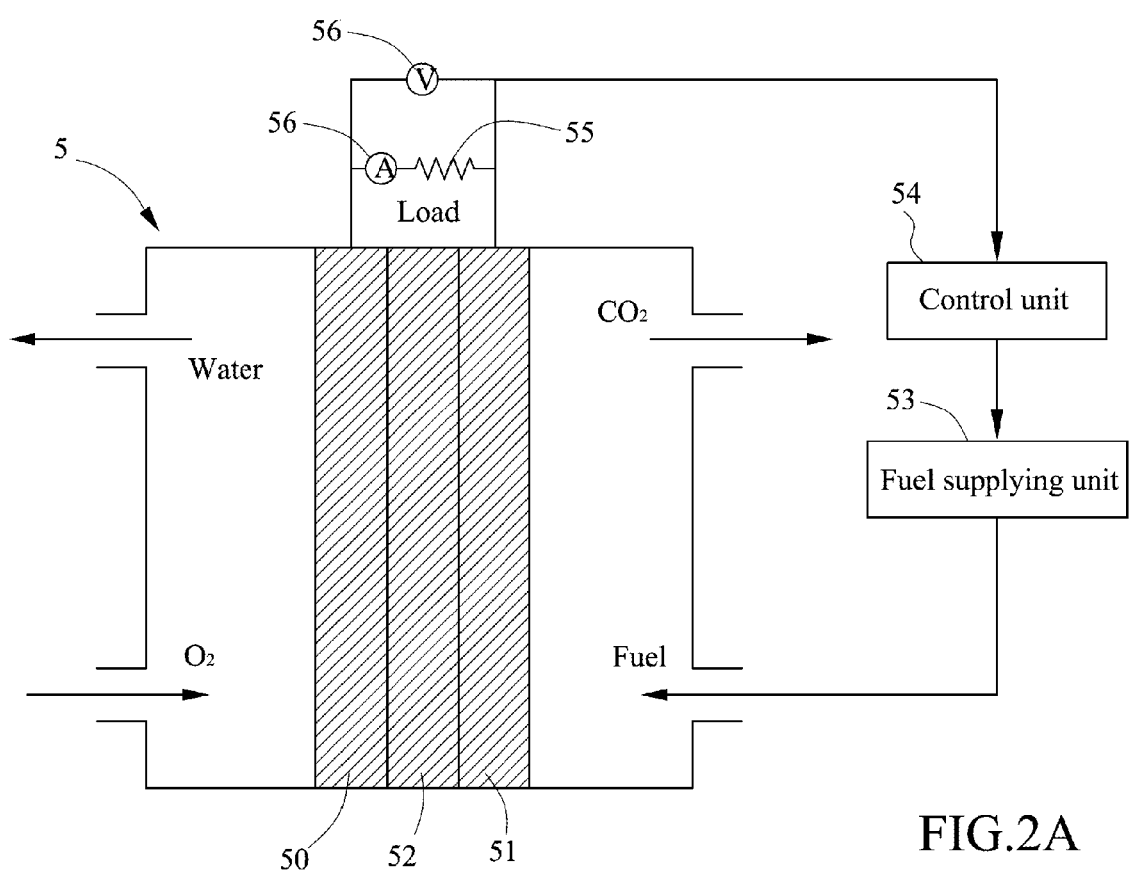
FIG. 2A is a schematic diagram showing a fuel cell system of the invention

Please refer to FIG. 1, which is a flow chart depicting steps of a method for supplying fuel to fuel cell according to a first embodiment of the invention. The method for supplying fuel to fuel cell shown in FIG. 1 starts from step 10. At step 10, a determining process is performed for determining a specific monitoring period for a fuel cell when the fuel cell is subjected to a load; and then the flow proceeds to step 11. In this first embodiment, the fuel cell is structured as the one shown in FIG. 2A, which is configured with two tubing system, one being provided for a fuel, such as methanol, and oxygen to be supplied to the fuel cell therefrom while another one for draining water, carbon dioxide and other reactants. As shown in FIG. 2A, the core of the fuel cell 5 is a single fuel cell, which is comprised of an anode 51, a cathode 52 and a proton exchange membrane (PEM) 53. Moreover, there is a load to be used for connecting the anode 50 with the cathode 53 and thereby forms an electric circuit. However, as shown in FIG. 2B and FIG. 2C, instead of the single fuel cell, the core of the fuel cell 5 can be a fuel cell stack 57 composing of a plurality of fuel cells 570 in that each fuel cell 570 is comprised of an anode, a cathode and a proton exchange membrane (PEM), similar to the one shown in FIG. 2A.

Figure 2B:
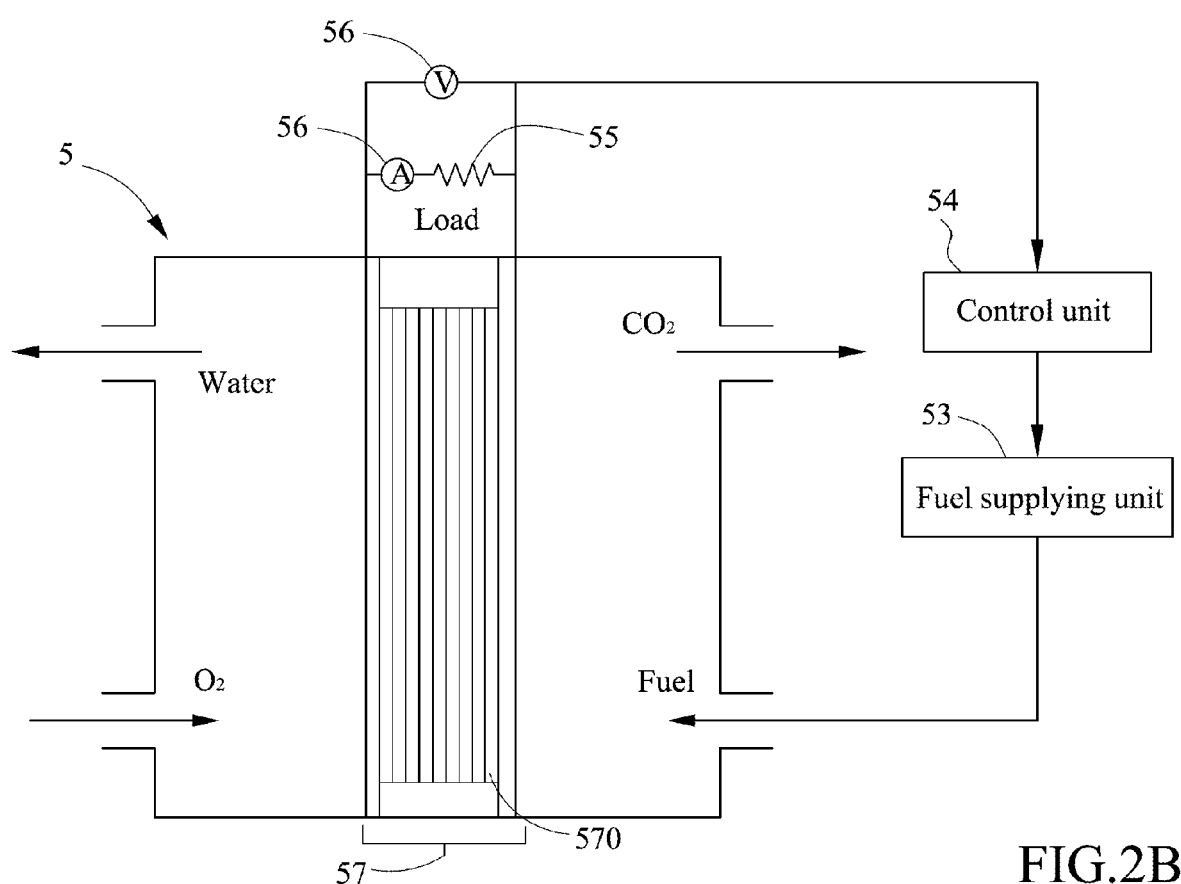
FIG. 2B and FIG. 2C are schematic diagrams showing two different fuel cell systems of the invention
Figure 2C:
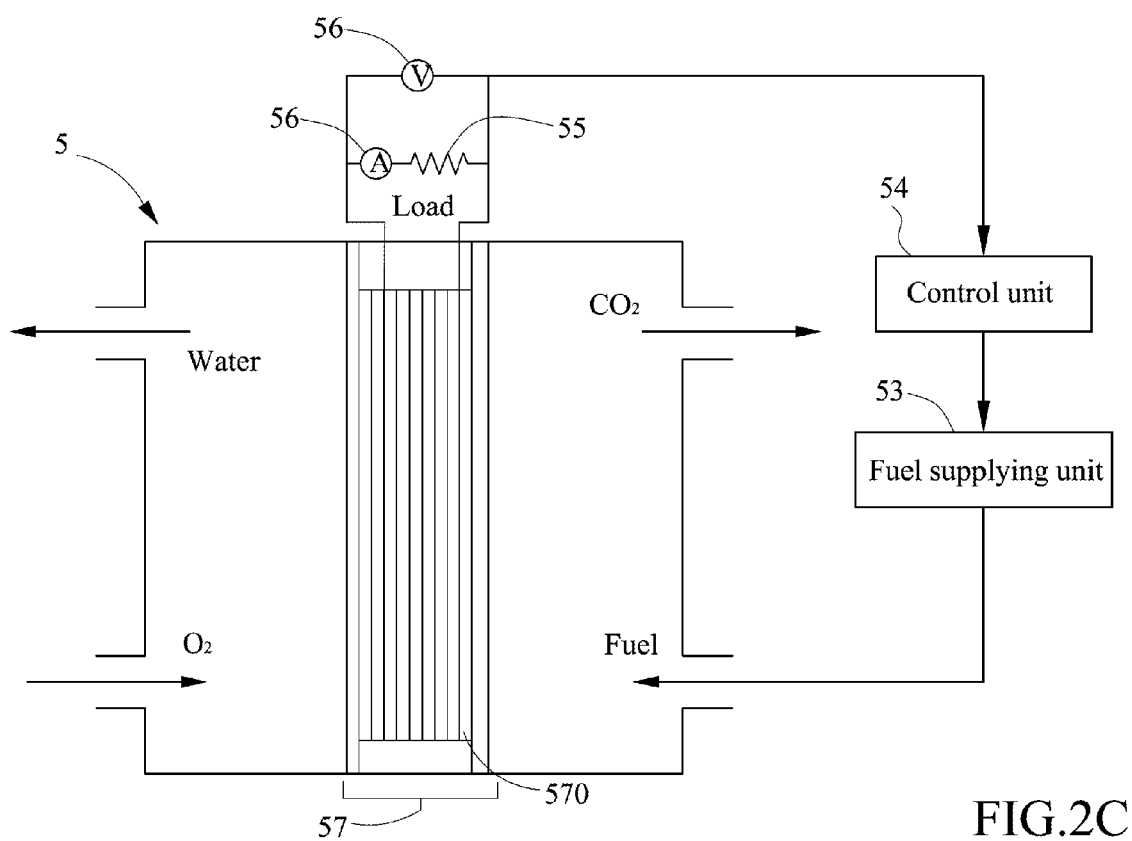

No matter the fuel cell is structured the same as the one shown in FIG. 2A, FIG. 2B or FIG. 2C, its load is connected to a measurement device 56, which is used for measuring specific characteristic values of the load. It is noted that the measurement device 56 can be a current meter or a voltage meter. In this first embodiment, a current meter is being adopted as the measurement device 56 so that it is serially connected with the load. However, if the measurement device 56 is a voltage meter, it should be parallel-connected to the load so as to be used for measuring voltage relating to the load. In addition, the fuel cell further has a control unit 54, which is used for receiving signals from the meter 56 so as to perform a calculation of numerical integration and logistic evaluation while issuing a control signal basing upon the calculation result to a fuel supplying unit 53 for enabling the same to perform a fuel supplying operation.

Preferably, the fuel provided by the fuel supplying unit 53 can be a hydrogen-rich fuel suitable for the fuel cell. For instance, the hydrogen-rich fuel for polymer electrolyte fuel cell (PEFC) should be a material selected from the group consisting of methanol, ethanol, and boron hydride. In addition, the hydrogen-rich fuel is not limited to be liquid as hydrogen can be used as fuel for proton membrane fuel cell (PEMFC) for instance. That is, the fuel used in the invention can be any fuel only if it is suitable for fuel cells. As in this embodiment the direct methanol fuel cell (DMFC) is used for illustration, methanol is used as the fuel in this embodiment.

Figure 4A:
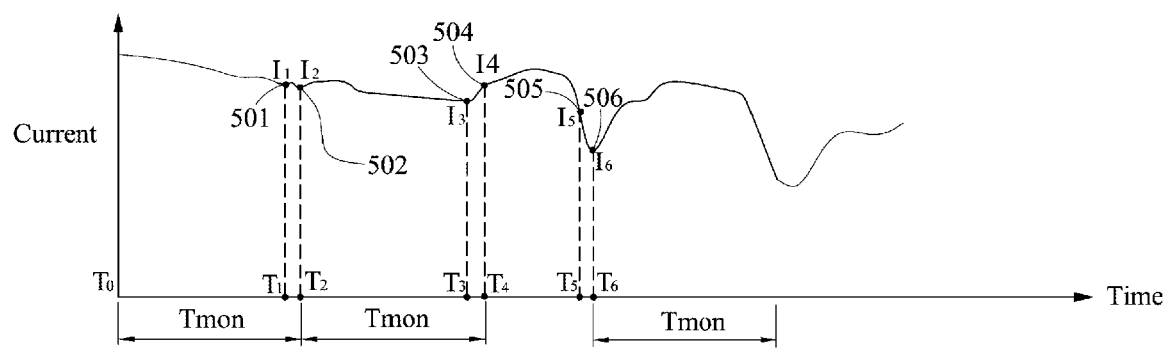
FIG. 4A plots a current curve of a fuel cell operating under the fuel supplying method of the invention.
Figure 7A:
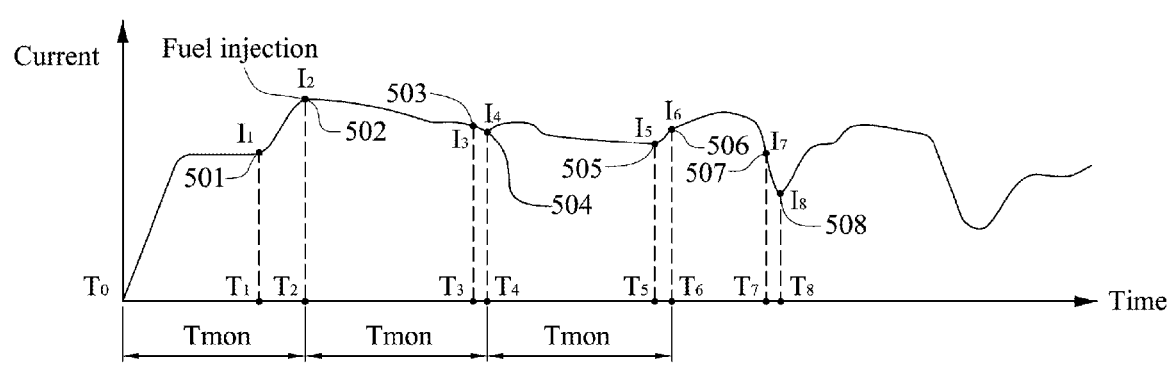
FIG. 7A plots another current curve of a fuel cell operating under the fuel supplying method of the invention.

Back to the step 11 of FIG. 1, a specific amount of a fuel is determined to be injected into the fuel cell according to the measurement of a function relating to the time integral of a specific characteristic value resulting from the reaction of the fuel cell within the monitoring period. It is noted that the characteristic value, being a value selected from the group consisting of voltage, current, power and the combination thereof, is generated from a unit of the fuel cell whereas the poser unit is a device selected from the group consisting of: a unit being composed of the whole fuel cell stack 57 as the one shown in FIG. 2B; a unit being a single cell as the one shown in FIG. 2A; and a unit composed of a portion of the fuel cells in the whole fuel cell stack as the one shown in FIG. 2C. As the load shown in FIG. 2A and FIG. 2B can be varying dynamically, the characteristic value of the operating fuel cell will be varying in respond to the dynamic variation of the load. Therefore, for adapting the fuel cell for the dynamic load, a function relating to the time integral of the characteristic value resulting from the reaction of the fuel cell within the monitoring period is obtained so as to be used for determining a specific amount of a fuel to be injected into the fuel cell. In this embodiment, the integral function for determining a specific amount of a fuel to be injected into the fuel cell is as following:

$$M(I_2) = \frac{\int_{T4}^{T6} I_2 \times 1/R \, dt}{NW} * u + k * \frac{\int_{T6}^{T8} I_2 \times 1/R \, dt}{NW} * u \quad (1)$$

$$R = \frac{\eta_{fuel}(I_2)}{\eta_{fuel}(I_1)}$$

wherein $M(I_2)$ represents the amount of fuel to be injected at load $I_2$, in unit of g;
  t is the monitoring period, in unit of sec, as the boundary conditions for defining $T_4$, $T_6$, $T_8$ are illustrated in FIG. 4A and FIG. 7A hereinafter;
  I is the characteristic value, in unit of amp as it is the current of the fuel cell, in which $I_1$ is high load, $I_2$ is low load;
  u is a unit weight for sustaining high load $I_1$, in unit of g;
  $\eta_{fuel}(I)$ represents fuel efficiency at load I;
  R is the modification factor of fuel efficiency;
  K is a compensation factor which can be a constant;
  NW (Normalize Factor) is a function related to the electron transfer number n of the fuel cell's electrochemical reaction, the Faraday constant F (96480 A s mol$^{-1}$), and system configurations of the fuel cell such as MEA, channel types, output wattage, the amount of each injection, and the duration of the monitoring period, and so on.

Although current is used as the characteristic value in this embodiment, it is not limited thereby and thus can be voltage or power of the fuel cell. As for the duration of the monitoring period is often being determined according to actual requirement and thus being determined according to experimental results. Therefore, the duration of the monitoring period can be determined by those skilled in the art according to actual requirement without any limitation. In addition, the value u, being a unit weight for sustaining the high load $I_1$, is obtained by experimenting how much fuel the fuel cell is required for sustaining the same to operate smoothly while subjecting to a load of $I_1$.

Figure 3:
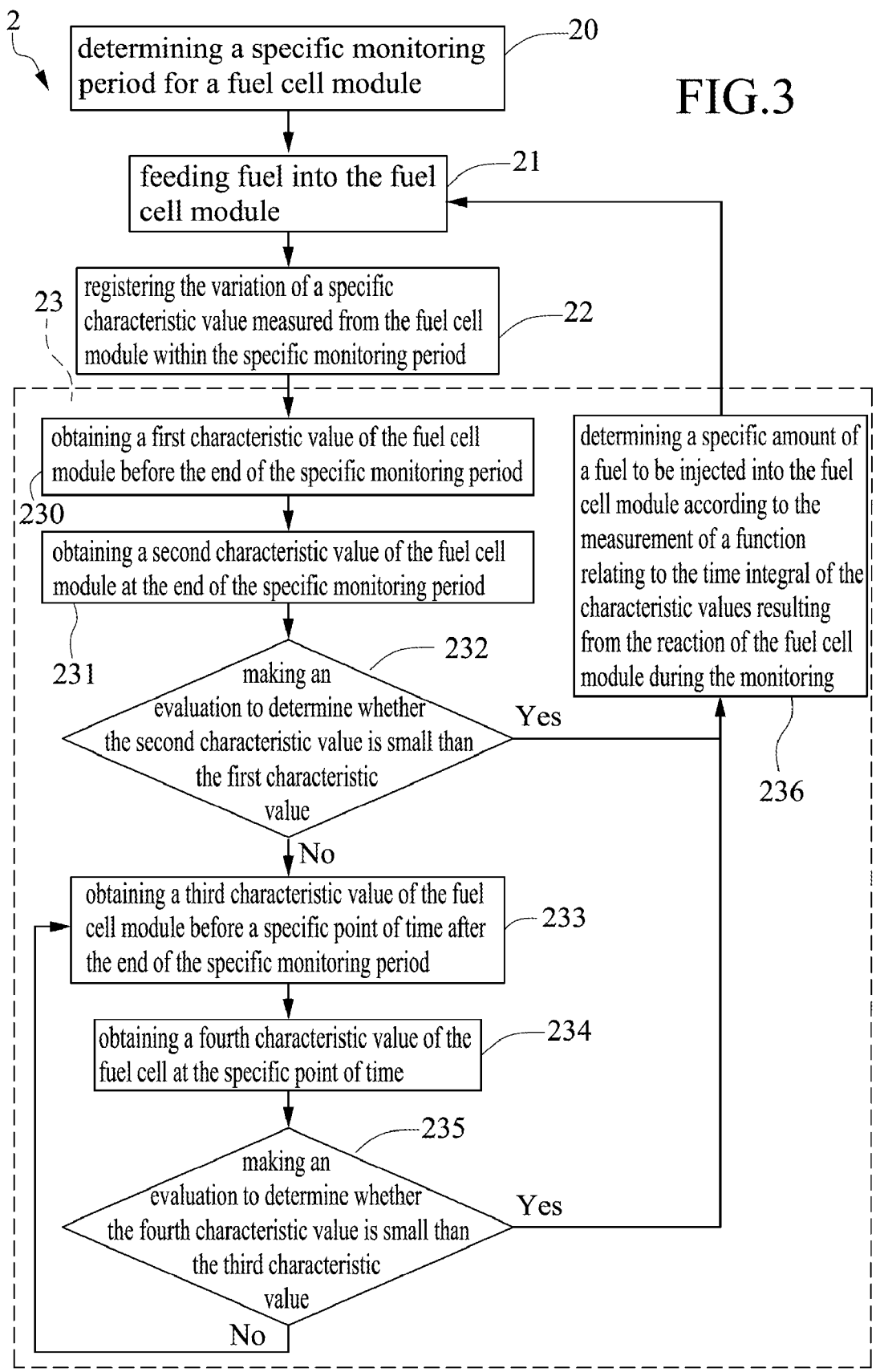
FIG. 3 is a flow chart depicting steps of a method for supplying fuel to fuel cell according to a second embodiment of the invention.

Please refer to FIG. 3, which is a flow chart depicting steps of a method for supplying fuel to fuel cell according to a second embodiment of the invention. The flow of the fuel supplying method 2 starts from the step 20. At the step 20, a specific monitoring period is determined for a fuel cell; and then the flow proceeds to step 21. It is noted that, in this second embodiment, the duration of the monitoring period is a specific period between each injection of fuel.

At step 21, a specific amount of a fuel to be injected into the fuel cell; and then the flow proceeds to step 22. Moreover, the fuel cell in this embodiment is structured similar to that shown in FIG. 2A or FIG. 2B so that no further description relating to its configuration will be provided herein. In addition, the fuel is a hydrogen-rich fuel, such as methanol, ethanol, or boron hydride, etc. In addition, the hydrogen-rich fuel is not limited to be liquid as hydrogen can be used as the fuel in PEMFC. In this embodiment, the fuel to be used is methanol. At step 22, the variation of a specific characteristic value measured from the fuel cell within the specific monitoring period is registered; and then the flow proceeds to step 23. At step 23, an evaluation is performed for evaluating the variation trend of the specific characteristic value at the end of the specific monitoring period to be used as a reference for determining whether to feed fuel to the fuel cell or not; if so, a specific amount of a fuel to be injected into the fuel cell is determined according to the measurement of a function relating to the time integral of the characteristic values resulting from the reaction of the fuel cell during the monitoring, i.e. according to the aforesaid integral function (1).

Figure 4B:
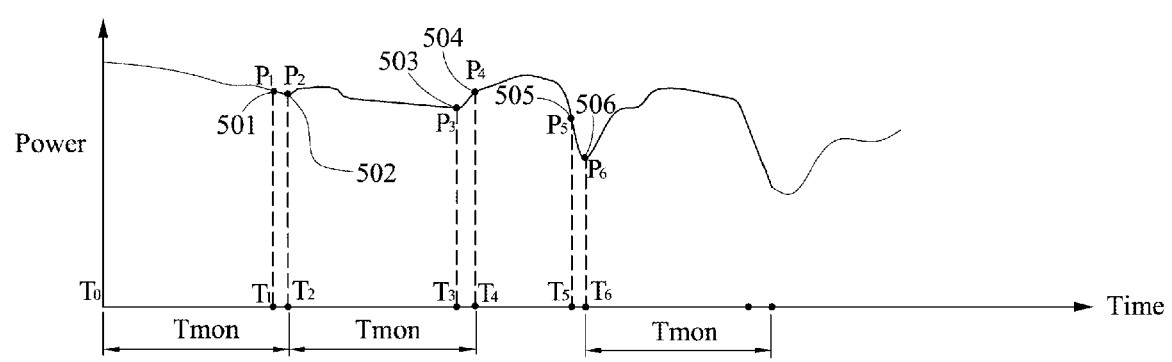
FIG. 4B plots a power curve of a fuel cell operating under the fuel supplying method of the invention.

For clarifying the happening in the step 23, please refer to FIG. 4A which plots a current curve of a fuel cell operating under the fuel supplying method of the invention. As the characteristic value is defined to be current in the step 22, the curve profiling the characteristic value of the fuel cell is the curve shown in FIG. 4A. As shown in FIG. 3, the step 23 is comprised of a plurality of sub-steps which starts at the step 230. At step 230, a first characteristic value of the fuel cell is obtained before the end of the specific monitoring period $T_{mon}$; and then the flow proceeds to step 231. The first characteristic value is a value selected from the group consisting of the minimum voltage measured during the specific monitoring period, the minimum current measured during the specific monitoring period, the minimum power measured during the specific monitoring period, and the combinations thereof. In this exemplary embodiment, the first characteristic value, being defined as the power of the fuel cell, can be current or voltage measured from the fuel cell, in which as power is the product of current and voltage, it is preferred for its enhanced resolution in logistically analyzing the module's performance. Please refer to FIG. 4B, which plots a power curve of a fuel cell operating under the fuel supplying method of the invention. Generally, the performance of a fuel cell in the laboratory may be experimentally evaluated under constant voltage, constant current, or constant resistance modes with an electronic load. For instance, when a fuel cell is used as the power supply of notebook computers and is parallel-connected with a Lithium-ion battery to form a hybrid power source, it is likely that the system is performing under constant resistance mode so that the power curve and the voltage curve basically are conforming to the current curve as the one shown in FIG. 4A. As shown in FIG. 4B, because the power output of the fuel cell is given by the product of voltage and current, the use of power as the characteristic value of the fuel cell can enhance control resolution and accuracy. However, in reality, the fuel cell is not limited to operate under constant current mode or constant voltage mode. In the embodiment shown in FIG. 4A, the first characteristic value is defined to be the minimum power measured during the specific monitoring period, which is substantially the power $P_1$ measured at point 501. In addition, the first characteristic value can be selected from the group consisting of an average of characteristic values associated with a time zone in the specific monitoring period, a root mean square (RMS) of the characteristic values associated with a time zone in the specific monitoring period; and statistic values calculated by performing other mathematical operations upon characteristic values associated with a time zone before the specific point of time, and so on.

At step 231, a second characteristic value of the fuel cell is obtained at the end of the specific monitoring period $T_{mon}$; and then the flow proceeds to step 232. It is noted that the second characteristic value can be selected from the group consisting of current measured from the fuel cell, voltage measured from the fuel cell, power measured from the fuel cell, and the combination thereof. In the embodiment shown in FIG. 4B, the second characteristic value is defined as the power, which is substantially the power $P_2$ measured at point 502. At step 232, an evaluation is made to determine whether the second characteristic value is small than the first characteristic value; if so, then the flow proceeds back to step 236 for determining a specific amount of fuel to be inject into the fuel cell as the fuel had been exhausted to a certain extent; otherwise, the flow proceeds to step 233 as there is still excess fuel remaining in the fuel cell. For example, in FIG. 4A, as the power $P_1$ measured at point 501 is larger than the power $P_2$ measured at point 502, it represents that the fuel in the fuel cell had been exhausted to an extent that the fuel cell will no longer able to operated and requires to be feed with fuel. At step 236, the specific amount of a fuel to be injected into the fuel cell is determined according to the measurement of a function relating to the time integral of the characteristic values resulting from the reaction of the fuel cell during the monitoring, i.e. the integral function (1). Moreover, the duration of the monitoring $T_{mon}$ in this embodiment is equal to $(T_2-T_0)$ for the first term of the integral function (1) and the second compensation term is zero.

After injecting fuel into the fuel cell, the flow is directed back to perform the step 21, step 22 and then the step 23 again for lasting another monitoring period $T_{mon}$, in which the step 230 and the step 231 are performed before the end of the new monitoring period $T_{mon}$. In this embodiment, the first characteristic value is defined to be the minimum power measured during the second monitoring period, which is substantially the power $P_3$ measured at point 503; and the second characteristic value is defined to be the power $P_4$ measured at point 504. Thereafter, the two obtained characteristic value is compared in the step 232 for evaluating whether the second characteristic value is smaller than the first characteristic value. As shown in FIG. 4B, the power $P_3$ measured at point 503 is smaller than the power $P_4$ measured at point 504 so that there is still excess fuel remaining in the fuel cell system and thus step 233 will be proceeded.

At step 233, a third characteristic value of the fuel cell is obtained at a time point $T_5$ before a specific point of time $T_6$ after the end of the second monitoring period, which is defined as the power $P_5$ measured at point 505; and then the flow proceeds to step 234. At step 234, a fourth characteristic value of the fuel cell is obtained at the specific point of time $T_6$, which is defined as the power $P_6$ measured at point 506; and then the flow proceeds to step 235. At the step 235, an evaluation is made to determine whether the fourth characteristic value is small than the third characteristic value; if so, the flow proceeds to step 236; otherwise, the flow proceeds to step 233. In the embodiment shown in FIG. 4B, as the power $P_6$ is smaller than the power $P_5$, the step 236 will be performed for determining a specific amount of a fuel to be injected into the fuel cell according to the measurement of a function relating to the time integral of the characteristic values resulting from the reaction of the fuel cell during the monitoring, i.e. the integral function (1). In this embodiment, the current characteristic value is integrated between the time point $T_2$ and $T_6$ for the first term of the integral function (1) and the second term is zero, whereas $T_2$ is the lower limit of the integration and $T_6$ is the upper limit of the integration function (1). After the step 236 is complete, the flow will be directed back to the step 21 for starting another cycle of monitoring. On the other hand, when the fourth characteristic value is larger than the third characteristic value, it represents that there is still excess fuel remaining in the fuel cell so that the flow is directed back to the step 233 for staring another monitoring by obtaining new third and fourth characteristic values and thus the fuel supply of the fuel cell is under constant monitoring and adjustment for sustaining the fuel cell to operate continuously and normally. It is noted that the interval between the point 505 and the point 506 is specified to be one second, but is not limit thereby.

Please refer to FIG. 5, which is a flow chart depicting steps of a method for supplying fuel to a fuel cell according to a third embodiment of the invention. In the third embodiment, the step 30 to step 32 are the same as those described in the second embodiment while the only difference is in the step 33, in that the determination of whether the fuel cell has exhausted its fuel is based on an evaluation for determining whether a slope is a positive value or a negative value. At step 330, a first slope is obtained from a curve profiling the variation of the characteristic value at the end of the specific monitoring period; and then the flow proceeds to step 331. At step 331, an evaluation is made for determining whether the first slope is a positive value; if so, then the flow proceeds to step 332; otherwise, the flow proceeds back to step 334 for determining a specific amount of a fuel to be injected into the fuel cell according to the measurement of a function relating to the time integral of the characteristic values resulting from the reaction of the fuel cell during the monitoring, i.e. the integral function (1); and then the flow proceeds back to the step 31 where the specific amount of fuel is injected into the fuel cell. At step 332, a second slope is obtained from the curve profiling the variation of the characteristic value at the end of another monitoring period continuing the aforesaid monitoring period; and then the flow proceeds to step 333. At step 333, an evaluation is made to determine whether the second slope is a positive value; if so, then the flow proceeds to step 332; otherwise, the flow proceeds back to step 334 for determining a specific amount of a fuel to be injected into the fuel cell according to the measurement of a function relating to the time integral of the characteristic values resulting from the reaction of the fuel cell during the monitoring, i.e. the integral function (1); and then the flow proceeds back to the step 31 where the specific amount of fuel is injected into the fuel cell.

Figure 6:
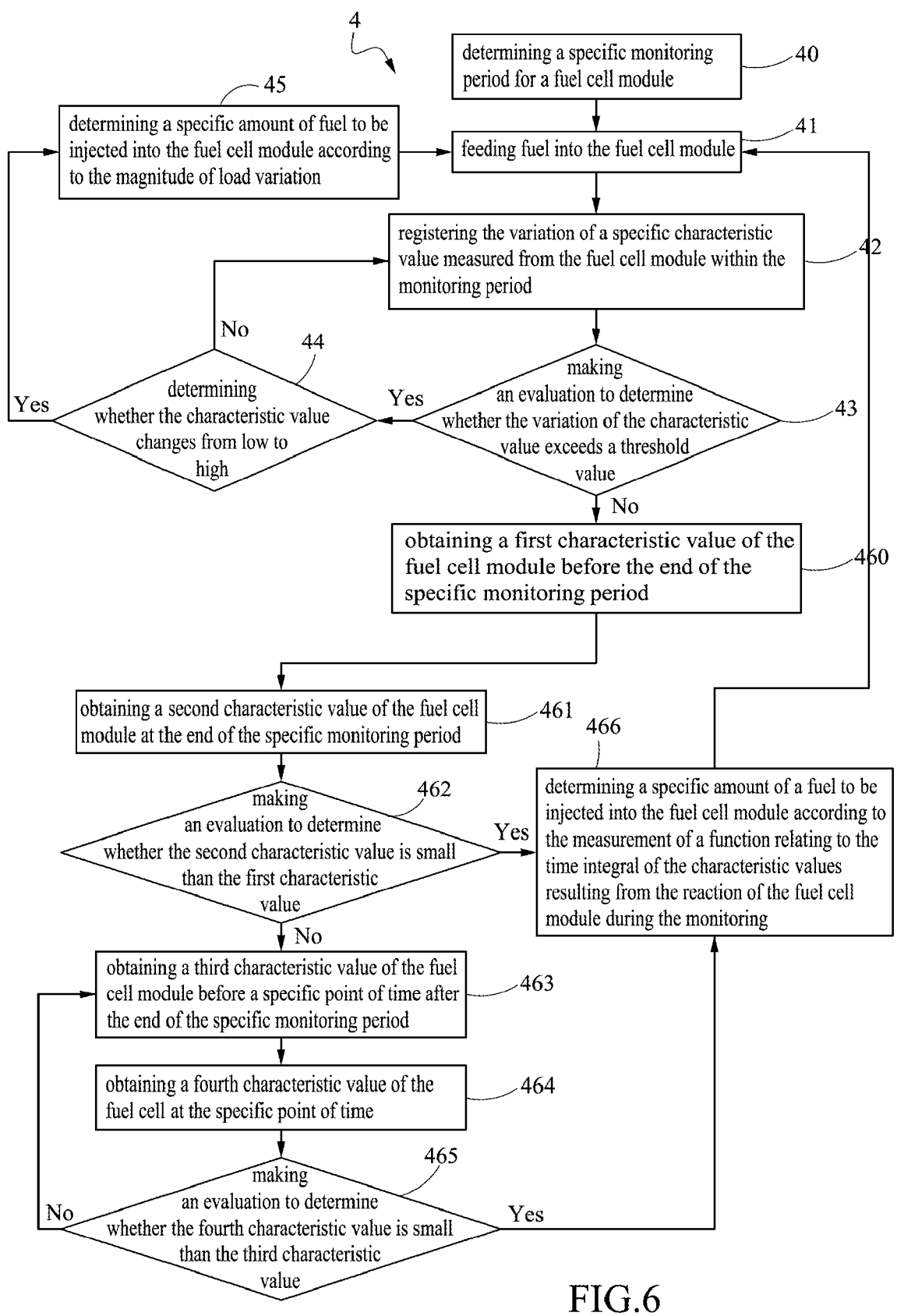
FIG. 6 is a flow chart depicting steps of a method for supplying fuel to fuel cell according to a fourth embodiment of the invention.

The aforesaid embodiments only illustrates the conditions when the load is varying within a small range, the present invention also provide a fuel supplying method adapted for the fuel cell subjecting to a load of large variation. Please refer to FIG. 6, FIG. 7A and FIG. 7B, which are flow chart depicting steps of a method for supplying fuel to fuel cell according to a fourth embodiment of the invention and two diagrams plotting respectively a current curve and a power curve of a fuel cell operating under the fuel supplying method of the invention. The flow of the fuel supplying method 4 starts from the step 40. At the step 40, a specific monitoring period is determined for a fuel cell; and then the flow proceeds to step 41. It is noted that, in this fourth embodiment, the duration of the monitoring period is a specific period between each injection of fuel. At step 41, a specific amount of a fuel to be injected into the fuel cell; and then the flow proceeds to step 42.

At step 42, the variation of specific characteristic values measured from the fuel cell within the monitoring period are registered; and then the flow proceeds to step 43. At step 43, an evaluation is made to determine whether the percentage of variation of the characteristic value exceeds a threshold value; if so. The flow proceeds to step 44; otherwise, the flow proceeds to step 460. It is noted that the threshold value in this embodiment is defined to be 20%, so that when the percentage of variation, calculated by the formula as following: $(I_2-I_1)/I_1*100\%$, is larger than 20%, the flow will be directed to the step 44. Moreover, the threshold value can be determined according to actual condition and experience, and thus is not limited to be 20%. In FIG. 7A, in the duration of the specific monitoring period, as the variation of characteristic value measured between the point 501 and the point 502 exceeds the threshold value, i.e. the variation between the current $I_1$ measured at the point 501 of time $T_1$ and the current $I_2$ measured at the point 502 of time $T_2$ exceeds 20%, the flow proceeds to the step 44 for determining whether the characteristic value changes from low to high. The changing of the characteristic value performed in the step 44 can be performed by determining whether the difference between the current $I_1$ measured at the point 501 and the current $I_2$ measured at the point 502 is a positive value or a negative value, or by determining the slope of the curve between the point 501 and the point 502 is a positive value or a negative value. It is noted that the time interval $(T_2-T_1)$ between the point 501 and the point 502 can be determined according to the actual variation of the load.

In FIG. 7A, as the current $I_2$ is larger than the current $I_1$, the characteristic value is changing from low to high and thus the flow proceeds to step 45 for a specific amount of fuel to be injected into the fuel cell according to the magnitude of load variation; and then the flow proceeds back to the step 41 for injecting the amount of fuel into the fuel cell at the time $T_2$. Thereby, the method is able to instantly response to a condition of large load for supplying fuel to the fuel cell according to the variation between $I_1$ and $I_2$ as well as the experiment data. On the other hand, when the characteristic value is not changed from low to high, the flow is directed back to the step 42 for continuing the characteristic value monitoring. In this embodiment, as there is no certain load increasing during its second monitoring period $T_{mon}$, the flow will proceeds to step 46 where an evaluation is performed for evaluating the variation trend of the specific characteristic value at the end of the specific monitoring period to be used as a reference for determining whether to feed fuel to the fuel cell or not; if so, a specific amount of a fuel to be injected into the fuel cell is determined according to the measurement of a function relating to the time integral of the characteristic values resulting from the reaction of the fuel cell during the monitoring, i.e. according to the aforesaid integral function (1).

Figure 7B:
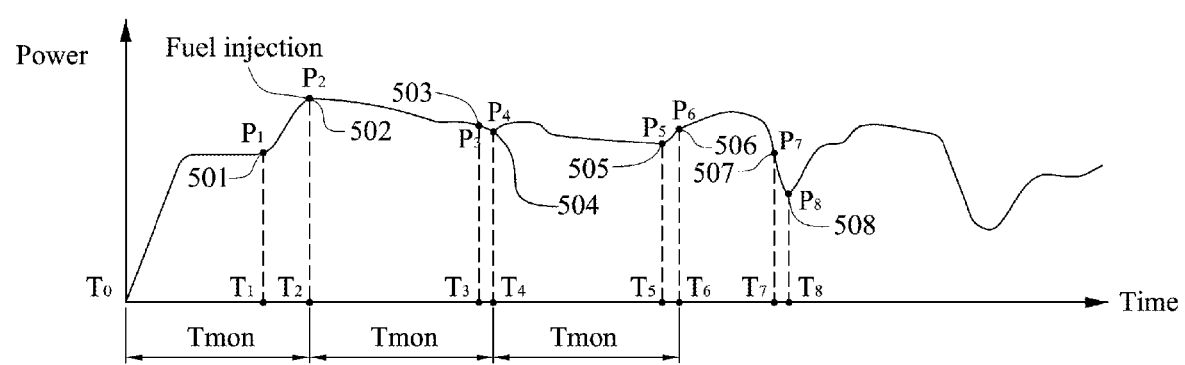
FIG. 7B plots another power curve of a fuel cell operating under the fuel supplying method of the invention.

At step 460, a first characteristic value is obtained which is the power $P_3$ measured at the point 503; and then the flow proceeds to step 461. At step 461, a second characteristic value is obtained which is the power $P_4$ measured at the point 504; and then the flow proceeds to step 462. At step 462, an evaluation is made to determine whether the second characteristic value is small than the first characteristic value; if so, the flow proceeds to step 466; otherwise, the flow proceeds to step 463. As shown in FIG. 7B, the power $P_4$ measured at the point 504 is smaller than the power $P_3$ measured at the point 503 which indicates that the fuel is not sufficient for sustaining the operation of the fuel cell, and thus the step 467 is performed for determining a specific amount of a fuel to be injected into the fuel cell according to the measurement of a function relating to the time integral of the characteristic values resulting from the reaction of the fuel cell during the monitoring, i.e. the integral function (1); and then the flow proceeds back to step 41 for repeating the monitoring.

As the embodiment shown in FIG. 7B, there is no large variation relating to the load during the third monitoring period so that the flow will proceeds to the step 46. At the step 460, a first characteristic value is obtained which is the power $P_5$ measured at the point 505; and then the flow proceeds to step 461. At step 461, a second characteristic value is obtained which is the power $P_6$ measured at the point 506; and then the flow proceeds to step 462. At step 462, an evaluation is made to determine whether the second characteristic value is small than the first characteristic value; if so, the flow proceeds to step 467; otherwise, the flow proceeds to step 463. As shown in FIG. 7B, the power $P_6$ measured at the point 506 is larger than the power $P_5$ measured at the point 505 which indicates that the fuel is still sufficient for sustaining the operation of the fuel cell, and thus the step 463 is performed. At step 463, an evaluation is being made for determining whether the variation of the characteristic value exceeds a threshold value; if so, the flow proceeds back to the step 44; otherwise, the flow proceeds to step 464. At step 464, a third characteristic value of the fuel cell is obtained at a time point $T_7$ before a specific point of time $T_8$ after the end of the second monitoring period; and then the flow proceeds to step 465. At step 465, a fourth characteristic value of the fuel cell is obtained at the specific point of time $T_8$; and then the flow proceeds to step 466. At the step 466, an evaluation is made to determine whether the fourth characteristic value is small than the third characteristic value; if so, the flow proceeds to step 467; otherwise, the flow proceeds to step 463. In the embodiment shown in FIG. 7B, as the power $P_8$ is smaller than the power $P_7$, the step 467 will be performed for determining a specific amount of a fuel to be injected into the fuel cell according to the measurement of a function relating to the time integral of the characteristic values resulting from the reaction of the fuel cell during the monitoring, i.e. the integral function (1). In this embodiment, the current characteristic value is integrated between the time point $T_4$ and $T_6$ for the first term of the integral function (1) and between $T_6$ and $T_8$ for the second term of the integral function (1). After the step 466 is complete, the flow will be directed back to the step 41 for starting another cycle of monitoring. On the other hand, when the fourth characteristic value is larger than the third characteristic value, it represents that there is still excess fuel remaining in the fuel cell so that the flow is directed back to the step 463 for staring another monitoring by obtaining new third and fourth characteristic values and thus the fuel supply of the fuel cell is under constant monitoring and adjustment for sustaining the fuel cell to operate continuously and normally. It is noted that the interval between the point 505 and the point 506 is specified to be one second, but is not limit thereby.

Figure 8:
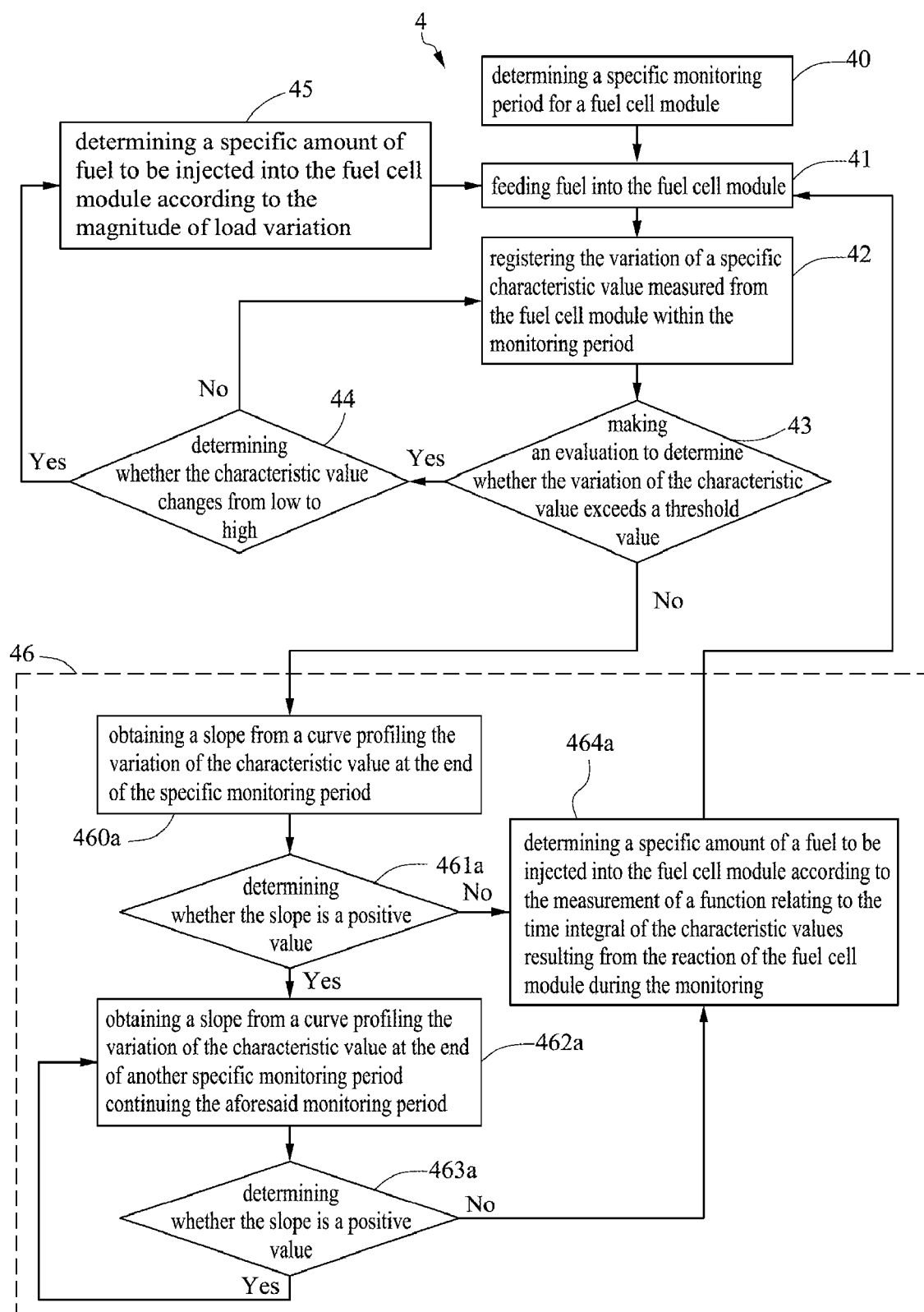
FIG. 8 is a flow chart depicting steps of a method for supplying fuel to fuel cell according to a fifth embodiment of the invention.

Please refer to FIG. 8, which is a flow chart depicting steps of a method for supplying fuel to fuel cell according to a fifth embodiment of the invention. The fuel supplying method of FIG. 8 is basically the same as that shown in FIG. 6, but is different in that: the comparison of characteristic value is replaced by the comparison of slope. Taking the characteristic curve shown in FIG. 7B for example, at step 460a, a slope is obtained at the point $P_4$ of the curve profiling the variation of the characteristic value at the end of the specific monitoring period, i.e. $T_4$; and then the flow proceeds to step 461a where it is determined whether it is a positive value or not. If it is positive which indicates that there is still sufficient fuel in the fuel cell and no need for fuel supplying, the flow will proceeds to step 462a; otherwise, the flow will proceeds to the step 465a for determining the amount of fuel to be injected into the fuel cell as the fuel is not sufficient indicating by the negative slope. At step 465a, a specific amount of a fuel is determined to be injected into the fuel cell according to the measurement of a function relating to the time integral of the characteristic values resulting from the reaction of the fuel cell during the monitoring.

When the slope is positive, the step 462a will be performed as the positive slope is measured at the point $P_6$ of the curve shown in the embodiment of FIG. 7B so that another evaluation is made for further determining whether the variation of the characteristic value exceeds a threshold value. Thus, at step 462a, an evaluation is made for further determining whether the variation of the characteristic value exceeds a threshold value; if so, the flow proceeds back to step 44; otherwise, the flow proceeds to step 463a. At step 463a, another slope is obtained from a curve profiling the variation of the characteristic value at the end of another specific monitoring period continuing the aforesaid monitoring period; and then the flow proceeds to step 464a. At step 464a, an evaluation is performed for determining whether the slope is a positive value; if so which indicates that there is still sufficient fuel in the fuel cell and no need for fuel supplying, the flow will proceeds to step 462a; otherwise, the flow will proceeds to the step 465a for determining the amount of fuel to be injected into the fuel cell as the fuel is not sufficient indicating by the negative slope, as the slope measured at the point $P_7$ of the curve at time $T_7$ in FIG. 7B. At step 465a, a specific amount of a fuel is determined to be injected into the fuel cell according to the measurement of a function relating to the time integral of the characteristic values resulting from the reaction of the fuel cell during the monitoring.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for supplying fuel to fuel cell, comprising the steps of:
   (a) determining a specific monitoring period for a fuel cell when the fuel cell is subjected to a dynamic-variationed load connected to a measurement device, which is used for measuring a specific characteristic value of the load and is composed of at least a fuel cell, each comprising an anode, a cathode and a proton exchange membrane; and
   (b) determining a specific amount of a fuel to be injected into the fuel cell according to the measurement of a function relating to the time integral of the specific characteristic value resulting from the reaction of the fuel cell within the specific monitoring period, wherein the function has a relation with respect to a modification factor R, which is a ratio of a fuel efficiency at the load having a first specific characteristic value to a fuel efficiency at the load having a second specific characteristic value.

2. The method of claim 1, wherein the characteristic value is selected from the group consisting of current measured from the fuel cell, voltage measured from the fuel cell, power measured from the fuel cell, and the combination thereof.

3. The method of claim 1, wherein the characteristic value is generated from a power unit of the fuel cell and the power unit is a device selected from the group consisting of: a unit being composed of the whole fuel cell stack; and a unit composed of a portion of the fuel cells in the whole fuel cell stack.

4. The method of claim 1, wherein the load with respect to the first specific characteristic value is lower than the load with respect to the second specific characteristic value.

* * * * *